Oct. 17, 1961     E. WATSON     3,005,149
NUCLEAR MAGNETIC RESONANCE DETECTORS
Filed Oct. 20, 1958
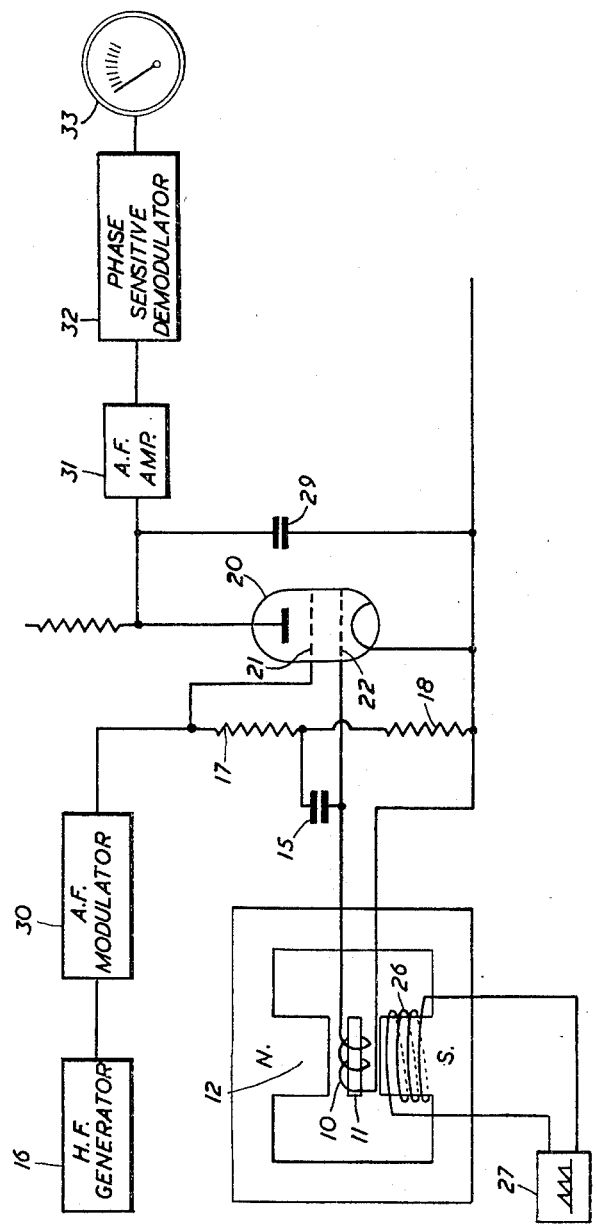
INVENTOR
EDWARD WATSON
BY
Watson, Cole, Grindle & Watson
ATTORNEY

United States Patent Office 3,005,149
Patented Oct. 17, 1961

3,005,149
NUCLEAR MAGNETIC RESONANCE
DETECTORS
Edward Watson, Hayes, England, assignor, by mesne assignments, to Fairey Aviation Limited, Hayes, England, a company of Great Britain
Filed Oct. 20, 1958, Ser. No. 768,304
Claims priority, application Great Britain Oct. 21, 1957
3 Claims. (Cl. 324—.5)

This invention relates to nuclear magnetic resonance detectors.

It is known that since the nucleus of an atom possesses a magnetic field and an angular momentum, the nuclei of a sample of a material placed in an external magnetic field will undergo precessional rotation and the speed of such rotation is generally within the radio-frequency range, i.e. between a hundred thousand revolutions per second and fifty million revolutions per second. Whilst a study of the quantum theory is required to determine the precise behaviour of such nuclei, it is broadly true to say that they behave in the manner of a tuned circuit. In particular if a sample of material is placed in a coil in a transverse magnetic field and an alternating current is passed through the coil at the particular frequency corresponding to a particular material, the nuclei will be brought into resonance with it. Moreover the resonance may be detected by the fact that the sample absorbs energy from the coil.

Certain methods of determining the nuclear resonance frequency of a sample on this basis have been proposed, but these methods are open to certain disadvantages which it is an object of the present invention to reduce or eliminate.

According to the present invention a nuclear magnetic resonance detector includes a test coil to receive the specimen in a transverse magnetic field, means for applying a high frequency input signal to a circuit which includes the test coil and which is tuned to the frequency of the input signal nd means responsive to the phase difference between the input signal and the potential across the coil, so as to indicate the phase shift caused by the presence of a sample in the coil.

Thus for example in the case of a series tuned circuit in the absence of a specimen the potential difference across the coil will be substantially 90° out of phase with the input potential difference at resonance, and the same thing will be true when a specimen is present but the frequency of the circuit is substantially above or substantially below the resonant frequency of the specimen. As the frequency of the circuit approaches the resonant frequency of the specimen the phase difference will depart from 90° by a small amount due to the frequency dispersion effects in the specimen. The value rarely exceeds a few minutes of arc.

Thus in one form of the invention a potential corresponding to the input signal and a potential corresponding to that across the coil are applied to a mixing valve to produce an output corresponding to the product, and the output is filtered to give a signal corresponding to the phase displacement.

Thus for example if the two input signals to the mixing vave are respectively $A \cos \omega t$ and $B \cos (\omega t + \phi)$, then their product $AB \cos \omega t \cos (\omega t + \phi)$ will be equal to $$\frac{AB}{2}(\cos (2\omega t + \phi) + \cos \phi)$$

so that if the high frequency components $\cos (2\omega t + \phi)$ is filtered out there will remain a component proportional to $\cos \phi$. When $\phi$ is equal to 90° this will be zero so that the filtered output will correspond with the phase displacement which arises when the frequency is just below or just above resonance with the specimen.

Conveniently the input is modulated, for example at audio-frequency, so that the output is an alternating signal at the modulation frequency, whereof the amplitude represents the phase displacement produced by the specimen. Preferably this output is fed through a narrow band amplifier. Such an arrangement materially improves the signal-to-noise ratio and in addition the use modulation facilitates stable amplification.

The invention may be carried into practice in various ways but one specific embodiment will be described by way of example with reference to the accompanying drawing which is a schematic circuit diagram of the arrangement.

In this embodiment the apparatus includes a small test coil 10 designed to receive a sample 11 to be analysed within a transverse magnetic field of a very high degree of uniformity provided by a powerful permanent magnet assembly 12. The establishment of the magnetic field forms no part of the present invention but may be conveniently carried out in accordance with the present applicant's U.S. application Serial Number 767,434.

The test coil 10 is connected in series with a capacitor 15 to form a series tuned circuit. An alternating signal from a crystal-controlled generator 16 at the frequency of the tuned circuit is applied across a resistance potential divider 17, 18 and the tuned circuit is connected across one section of the potential divider. For example the potential divider may have a total resistance of several houndred ohms whilst the section 18 across which the tuned circuit is connected may have a resistance of one ohm. In addition the input signal is applied directly to the mixer grid 21 of a mixing valve 20 whilst the potential across the coil is applied to its control grid 22.

In operation either the frequency of the tuned circuit and that of the input signal, or the resonant frequency of the specimen, is varied so as to pass through a condition of resonance. The resonant frequency of a given specimen can be varied by varying the strength of the transverse magnetic field and although it will usually be convenient to employ permanent magnets for producing the main field strength it is a simple matter to provide scanning coils 26 for increasing or decreasing the field strength produced by the permanent magnet over a small range. Accordingly it will normally be convenient to provide a number of fixed frequency settings for the generator and tuned circuit, to select one of these which is thought to be near the resonant frequency of the specimen, and then to vary the transverse magnetic field so as to scan the resonant frequency through the frequency of the generator and tuned circuit, by connecting the coils 26 to a suitable time base generator 27.

As indicated above the output from the mixing valve corresponds with the product of a component corresponding to the generator input and a component corresponding to the potential across the coil, and this is equivalent to a high frequency component and a direct current component. A small capacitor 29 is connected across the output of the valve to filter out the high frequency component, leaving only the direct current component which is zero when the phase difference between the input components is exactly 90°. Accordingly as the resonant frequency is scanned through the generator and tuned circuit frequency the output will exhibit a double-peak with an intermediate dip representing the resonant condition.

Preferably the signal from the generator is amplitude-modulated by means of a modulator 30, for example at an audio-frequency such as 400 cycles per second. In this case the output from the mixing valve may be passed through one or more audio-frequency amplifying stages 31 of narrow band width serving to amplify the audio-frequency signal corresponding to the phase displacement whilst rejecting spurious noise. To reproduce the dispersion signal of the specimen correctly, the audio-frequency from the amplitude modulation is demodulated by means of a phase sensitive detector 32, whence the output is fed to an indicating or recording meter or oscilloscope 33.

It is desirable that the mixing valve chosen should be one having low hum and microphony.

The arrangement described has a number of advantages over certain arrangements previously adopted. Thus in the first place the frequency of the oscillator may be rendered completely stable since it may be crystal-controlled. Moreover in certain previous arrangements it has been difficult to reduce the amplitude of the signal applied to the coil and hence to avoid saturation of the nuclear resonance effect. With the present arrangement the amplitude can be adjusted as desired since the current in the test coil is not relied upon to maintain oscillation. Moreover, as already indicated, all the amplification can be at audio-frequency, which greatly facilitates stable amplification, and moreover a narrow band width may be employed so as to cut down noise.

What I claim as my invention and desire to secure by Letters Patent is:

1. A nuclear magnetic resonance detector including means producing a magnetic field, a test coil adapted to receive a specimen and situated in the magnetic field with its axis transverse thereto, a series tuned circuit which includes the test coil and a capacitor in series, a mixing valve having at least two grids, means exteriorly of said valve for generating a radio frequency input signal, means coupling said input signal to the tuned circuit at the resonant frequency thereof, means coupling the other of said grids to said tuned circuit to receive a signal having a phase shift component developed across the coil due to a condition of magnetic resonance in the sample, said valve producing an output corresponding to the product of said signals to thereby comprise a phase shift component and a radio frequency component, and means for filtering the said output to remove the radio-frequency component and leave a signal dependent on the phase shift caused by a sample in the test coil.

2. A detector as claimed in claim 1 including means for modulating said radio frequency input signal, for example at audio-frequency so that the output is an alternating signal at the modulation frequency, whereof the amplitude represents the phase displacement produced by the specimen.

3. A detector as claimed in claim 2 comprising a narrow band amplifier for receiving said output signal.

References Cited in the file of this patent

Knoebel et al.: Review of Scientific Instruments, vol. 22, No. 12, December 1951, pp. 904 through 911.

Gabillard: Academie Des Sciences, Comptes Rendus, vol. 237, No. 14, October 1953, pp. 705 to 708.

Gutowsky et al.: The Review of Scientific Instruments, vol. 24, No. 8, August 1953, pp. 644–657.

Baker et al.: The Review of Scientific Instruments, vol. 28, No. 5, May 1957, pp. 313–321.